United States Patent
Yen et al.

(10) Patent No.: US 8,463,214 B2
(45) Date of Patent: Jun. 11, 2013

(54) ANTENNA DIVERSITY SYSTEM

(75) Inventors: Kuang-Yu Yen, Hsinchu County (TW); Der-Zheng Liu, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 55 days.

(21) Appl. No.: 13/275,321

(22) Filed: Oct. 18, 2011

(65) Prior Publication Data
US 2012/0094622 A1    Apr. 19, 2012

(30) Foreign Application Priority Data
Oct. 19, 2010  (CN) .......................... 2010 1 0511684

(51) Int. Cl.
*H04B 7/08* (2006.01)
*H04K 3/00* (2006.01)

(52) U.S. Cl.
USPC ....................................... 455/133; 455/277.1

(58) Field of Classification Search
USPC ............ 455/132–136, 227.1–277.2; 375/347
See application file for complete search history.

(56) References Cited

U.S. PATENT DOCUMENTS 2,898,455 A * 8/1959 Hymas et al. ................. 455/134
3,401,340 A * 9/1968 Cronburg, Jr. et al. ....... 455/134

* cited by examiner

*Primary Examiner* — Lee Nguyen
(74) *Attorney, Agent, or Firm* — Winston Hsu; Scott Margo

(57) ABSTRACT

An antenna diversity system having a non-interrupt function is provided. The antenna diversity system includes: a plurality of antennas, a plurality of radio frequency (RF) circuits, and a signal processing unit. The RF circuits are respectively coupled to the antennas, wherein each RF circuit is utilized for operating in one of a plurality of channels. The signal processing unit is coupled to the RF circuits, and utilized for determining whether a signal quality value of at least one of the antennas lower than a threshold to generate a determining result, and determining whether to change the channel of at least one of the RF circuits according to the determining result, so as to make at least two of the RF circuits operating in a same channel of the channels.

23 Claims, 4 Drawing Sheets

ANTENNA DIVERSITY SYSTEM

BACKGROUND

1. Technical Field

The disclosure relates to an antenna diversity system, and more particularly, to an antenna diversity system having a non-interrupting function.

2. Description of the Prior Art

Please refer to FIG. 1. FIG. 1 shows a simplified block diagram of a conventional antenna diversity system 100. As shown in FIG. 1, the conventional antenna diversity system 100 comprises: a first antenna 110, a second antenna 120, an RF circuit 130, a signal processing unit 140, and a switch unit 150. In the conventional antenna diversity system 100, when the best antenna is required to be selected to receive signals, the signal processing unit 140 has to measure a signal quality value of the original antenna (such as the first antenna 110) first, and then the signal processing unit 140 controls the switch unit 150 to switch to another antenna (such as the second antenna 120) to measure a signal quality value of the another antenna. Next, the signal processing unit 140 controls the switch unit 150 to select an antenna having the better signal quality value from the first antenna 110 and the second antenna 120 to receive the signals.

However, when the conventional antenna diversity system 100 switches antennas, there might be unstable conditions during the process of receiving the signals. In case the conventional antenna diversity system 100 switches to an antenna having bad a signal quality value, it will be not able to receive the signals smoothly, and even a signal interruption will occur.

BRIEF SUMMARY

It is therefore one of the objectives of the disclosure to provide an antenna diversity system having a non-interrupting function, so as to solve the above problem.

In accordance with an exemplary embodiment, an antenna diversity system is disclosed. The antenna diversity system comprises: a plurality of antennas, a plurality of radio frequency (RF) circuits, and a signal processing unit. The RF circuits are respectively coupled to the antennas, and utilized for operating in one of a plurality of channels. The signal processing unit is coupled to the RF circuits, and utilized for determining whether the signal quality value of at least one of the antennas is lower than a threshold to generate a determining result, and determining whether to change the channel of at least one of the RF circuits according to the determining result, so as to make at least two of the RF circuits operating in a same channel of the channels.

The antenna diversity system disclosed by the disclosure has a non-interrupting function, and is able to provide non-interrupting antenna diversity function for a specific channel having less transmission tolerance, so as to make the specific channel be able to use the best antenna to perform the transmission operation.

These and other objectives of the disclosure will no doubt become obvious to those of ordinary skill in the art after reading the following detailed description of the embodiment that is illustrated in the various figures and drawings.

DETAILED DESCRIPTION

Figure 1:
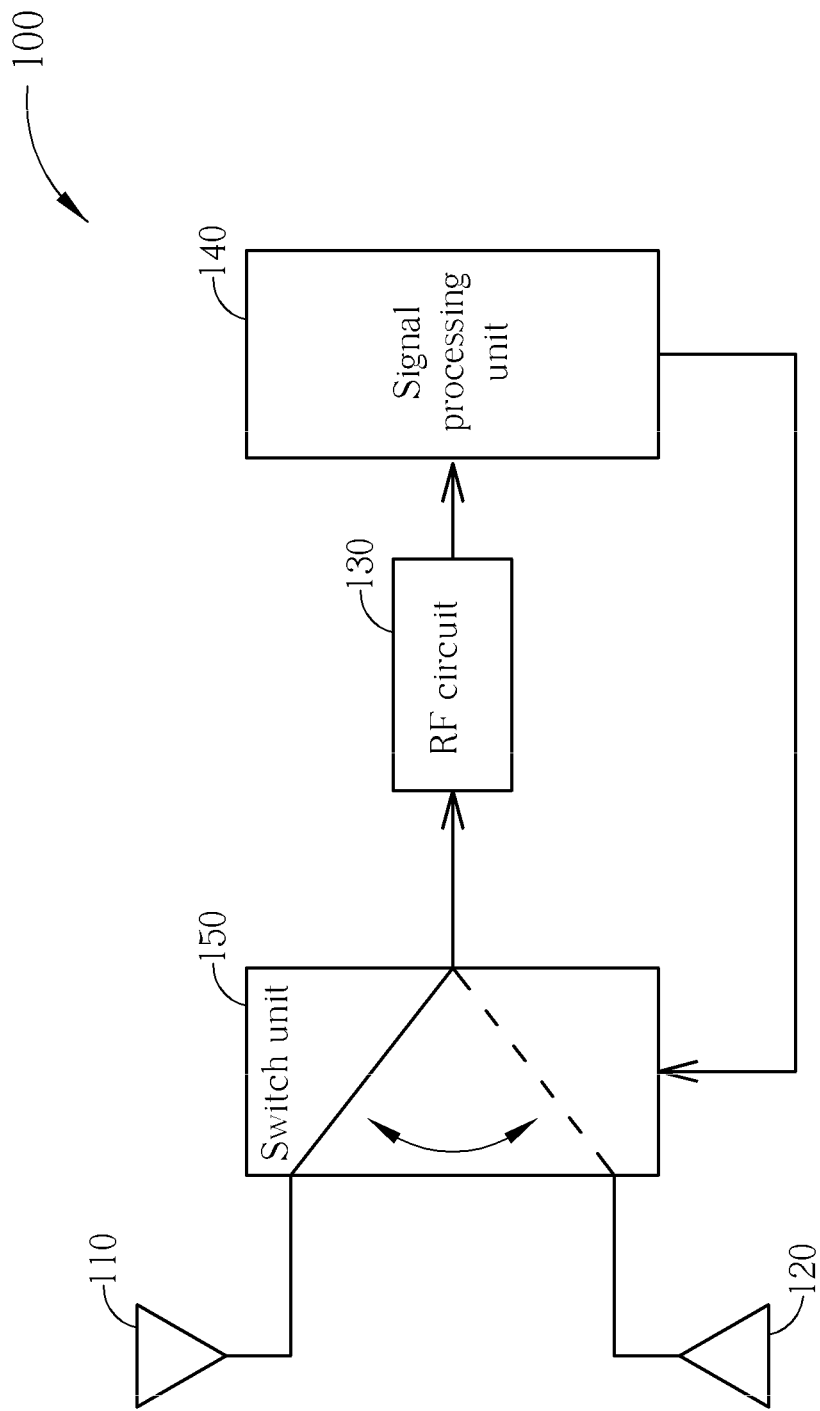
FIG. 1 shows a simplified block diagram of a conventional antenna diversity system.
Figure 2:
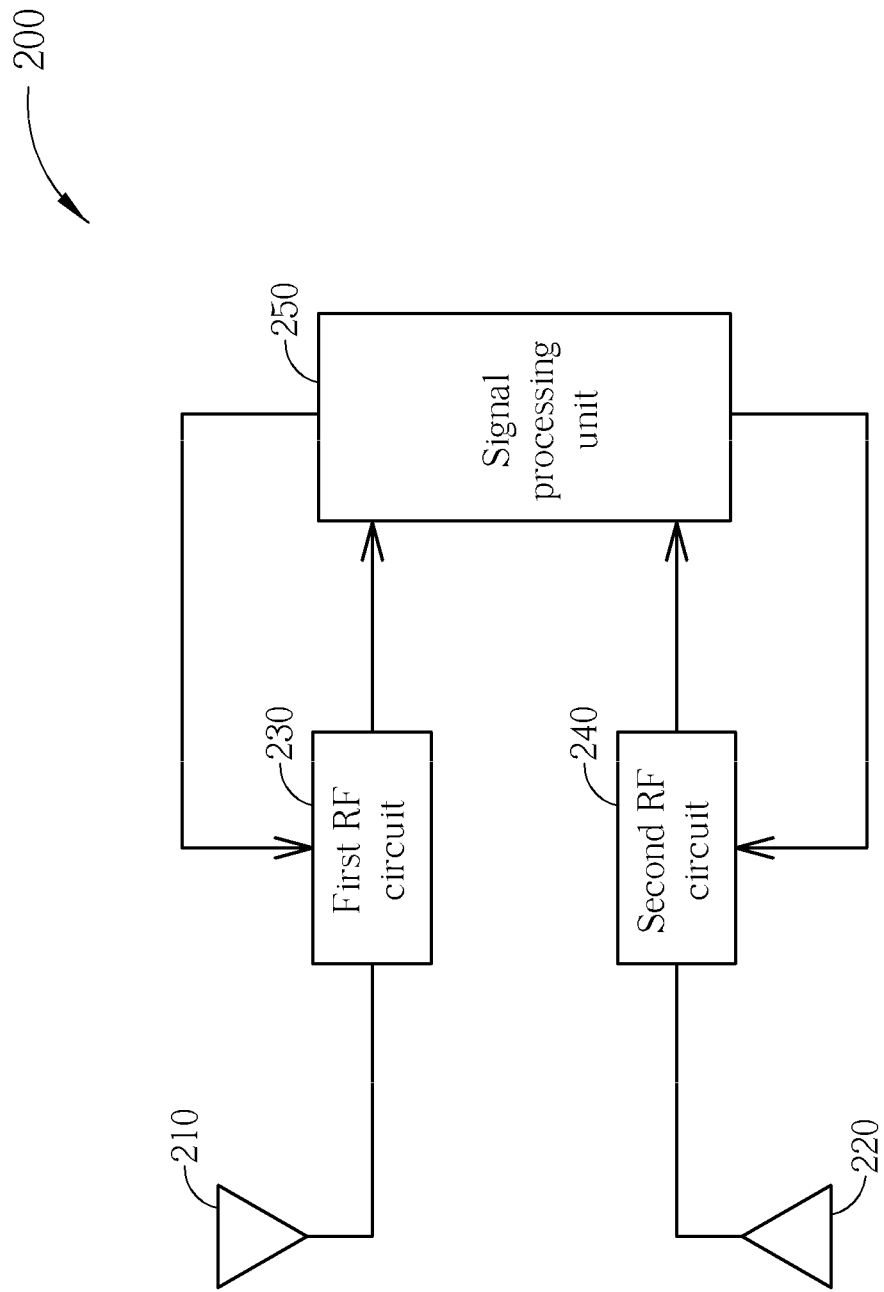
FIG. 2 shows a simplified block diagram of an antenna diversity system in a first embodiment.

Please refer to FIG. 2. FIG. 2 shows a simplified block diagram of an antenna diversity system 200 in accordance with a first embodiment. As shown in FIG. 2, the antenna diversity system 200 comprises: a first antenna 210, a second antenna 220, a first RF circuit 230, a second RF circuit 240, and a signal processing unit 250. The first RF circuit 230 and the second RF circuit 240 are coupled to the first antenna 210 and the second antenna 220, respectively. The first RF circuit 230 and the second RF circuit 240 are utilized for operating in a first channel and a second channel, respectively. The signal processing unit 250 is coupled to the first RF circuit 230 and the second RF circuit 240, and utilized for determining whether at least one of the signal quality values of one of the first antenna 210 and the second antenna 220 is lower than a threshold to generate a determining result, and determining whether to change the channel of one of the first RF circuit 230 and the second RF circuit 240 according to the determining result, so as to make the first RF circuit 230 and the second RF circuit 240 operating in a same channel (such as the first channel or the second channel). For example, if the signal processing unit 250 determines the signal quality value of the first antenna 210 in the first channel is lower than the threshold, then the signal processing unit 250 will switch the second RF circuit 240 to operate in the first channel.

Next, after the signal processing unit 250 changes the channel of one of the first RF circuit 230 and the second RF circuit 240 according to the determining result to make the first RF circuit 230 and the second RF circuit 240 operating in the same channel, the signal processing unit 250 can be further utilized for comparing the signal quality values of the first antenna 210 and the second antenna 220. For example, when the first RF circuit 230 and the second RF circuit 240 both operate in the first channel, and transmission tolerance of the first channel is less than that of the second channel (For example, the first channel is a video transmission channel, and the second channel is a data service transmission channel), if the signal processing unit 250 determines that the signal quality value of the first antenna 210 in the first channel is lower than the signal quality value of the second antenna 220 in the first channel, then the signal processing unit 250 will switch the first RF circuit 230 to operate in the second channel.

In this way, the antenna diversity system 200 of the disclosure can switch the two RF circuits 230, 240 to operate in a specific channel having less transmission tolerance to make the signal processing unit 250 measure and compare the signal quality values between the two different antennas 210, 220 in the specific channel, and then switch a RF circuit corresponding to an antenna having the worse signal quality value in the specific channel to another channel which has higher transmission tolerance. In other words, the signal processing unit 250 can select an antenna having the better signal quality value in the specific channel to continuously operate in the specific channel. Thus, the antenna diversity system 200 of the disclosure can provide a non-interrupting function for the specific channel having less transmission tolerance, so as to make the transmission service having less transmission tolerance be able to use the best antenna to perform the transmission operation.

For example, in the antenna diversity system 200 of the disclosure, presumed an initial status uses the first RF circuit 230 to operate in the channel of 5 GHz, that is, uses the first antenna 210 to transmit the video service which is more sensitive to the packet error rate and the latency and has less transmission tolerance in the channel of 5 GHz, and the initial status uses the second RF circuit 240 to operate in the channel of 2.4 GHz, that is, uses the second antenna 220 to transmit the data service which has higher transmission tolerance in the channel of 2.4 GHz. When the signal processing unit 250 determines the signal quality value of the first antenna 210 in the channel of 5 GHz is lower than the threshold, then the signal processing unit 250 will switch the second RF circuit 240 from the channel of 2.4 GHz to the channel of 5 GHz, that is, the signal processing unit 250 will temporarily interrupt the data service in the channel of 2.4 GHz to make the second antenna 220 to be utilized for receiving the video signals like the first antenna 210. Thus, the video service in the channel of 5 GHz will not be interrupted. Next, the signal processing unit 250 will compare the signal quality values of the first antenna 210 with the second antenna 220 in the channel of 5 GHz. If the signal processing unit 250 determines that the signal quality value of the first antenna 210 in the channel of 5 GHz is better than that of the second antenna 220 in the channel of 5 GHz, then the signal processing unit 250 will switch the second RF circuit 240 from the channel of 5 GHz to the channel of 2.4 GHz, that is, the signal processing unit 250 will choose to continuously use the first antenna 210 to receive the video signals in the channel of 5 GHz, and use the second antenna 220 to receive the data signals in the channel of 2.4 GHz; otherwise, if the signal processing unit 250 determines that the signal quality value of the first antenna 210 in the channel of 5 GHz is worse than that of the second antenna 220 in the channel of 5 GHz, then the signal processing unit 250 will switch the first RF circuit 230 from the channel of 5 GHz to the channel of 2.4 GHz, that is, the signal processing unit 250 will choose to continuously use the second antenna 220 to receive the video signals in the channel of 5 GHz, and use the first antenna 210 to receive the data signals in the channel of 2.4 GHz. Since the data service has fewer requirements for realtime signal transmission, the data service has higher transmission tolerance for the signal interruption caused by switching the antenna. Thus, it is practical to use protocol to provide temporary interrupting service and recovering service. In addition, please note that the above embodiment is only for an illustrative purpose and is not meant to be a limitation of the disclosure.

Figure 3:
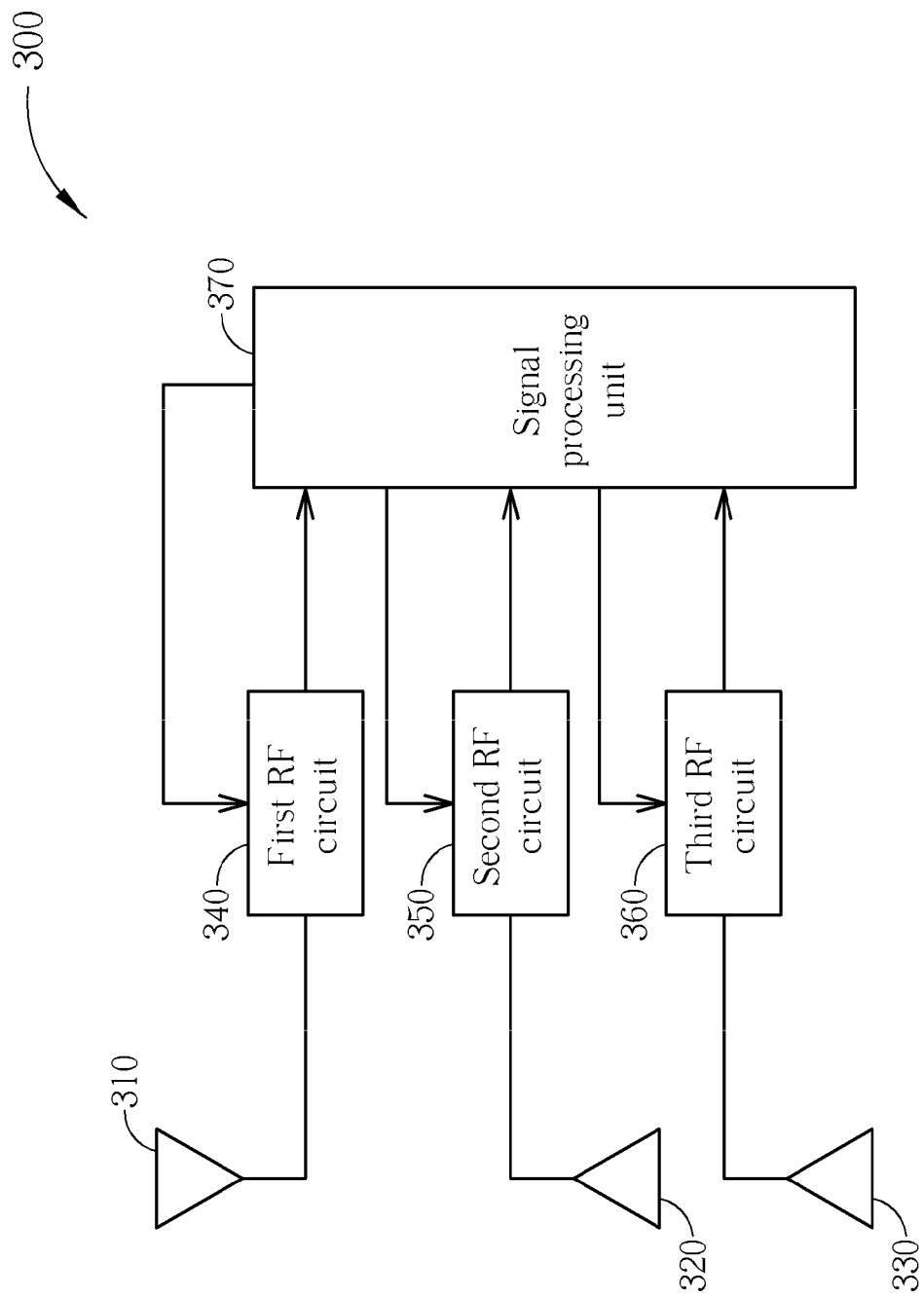
FIG. 3 shows a simplified block diagram of an antenna diversity system in a second embodiment.

Please refer to FIG. 3. FIG. 3 shows a simplified block diagram of an antenna diversity system 300 in accordance with a second embodiment of the disclosure. As shown in FIG. 3, the antenna diversity system 300 comprises: a first antenna 310, a second antenna 320, a third antenna 330, a first RF circuit 340, a second RF circuit 350, a third RF circuit 360, and a signal processing unit 370. The first RF circuit 340, the second RF circuit 350, and the third RF circuit 360 are coupled to the first antenna 310, the second antenna 320, and the third antenna 330, respectively. The first RF circuit 340 is utilized for operating in a first channel, and the second RF circuit 350 and the third RF circuit 360 are utilized for operating in a second channel. The signal processing unit 370 is coupled to the first RF circuit 340, the second RF circuit 350, and the third RF circuit 360, and utilized for determining whether the signal quality value of at least one of the first antenna 310, the second antenna 320, and the third antenna 330 lower than a threshold to generate a determining result, and determining whether to change the channel of at least one of the first RF circuit 340, the second RF circuit 350, and the third RF circuit 360 according to the determining result, so as to make at least two of the first RF circuit 340, the second RF circuit 350, and the third RF circuit 360 operating in a same channel (such as the first channel or the second channel). For example, if the signal processing unit 370 determines the signal quality values of the second antenna 320 and the third antenna 330 in the second channel are both lower than the threshold, then the signal processing unit 370 will switch the first RF circuit 340 to operate in the second channel. In addition, if the signal processing unit 370 determines the signal quality value of the first antenna 310 in the first channel is lower than the threshold, then the signal processing unit 370 will switch the at least one of the second RF circuit 350 and the third RF circuit 360 to operate in the first channel.

Next, after the signal processing unit 370 changes the channel of at least one of the first RF circuit 340, the second RF circuit 350, and the third RF circuit 360 according to the determining result to make at least two of the first RF circuit 340, the second RF circuit 350, and the third RF circuit 360 operating in the same channel, the signal processing unit 370 can be further utilized for comparing the signal quality values between the first antenna 310, the second antenna 320, and the third antenna 330. For example, when the first RF circuit 340, the second RF circuit 350, and the third RF circuit 360 all operate in the first channel, and transmission tolerance of the first channel is less than that of the second channel (For example, the first channel is a video transmission channel, and the second channel is a data service transmission channel), if the signal processing unit 370 determines that the signal quality value of the first antenna 310 in the first channel is lower than that of the second antenna 320 and the third antenna 330 in the first channel, then the signal processing unit 370 will switch the first RF circuit 340 to operate in the second channel; otherwise, if the signal processing unit 370 determines that the signal quality value of the first antenna 210 in the first channel is higher than the signal quality value of the second antenna 320 and the third antenna 330 in the first channel, then the signal processing unit 370 will switch both the second RF circuit 350 and the third RF circuit 360 to operate in the second channel.

In this way, the antenna diversity system 300 of the disclosure can switch the three RF circuits 340, 350, 360 to operate in a specific channel having less transmission tolerance to make the signal processing unit 370 measure and compare the signal quality values between the different antennas 310, 320, 330 in the specific channel, and then switch at least a RF circuit corresponding to at least an antenna having the worse signal quality value in the specific channel to another channel which has higher transmission tolerance. In other words, the signal processing unit 370 can select at least an antenna having the better signal quality value in the specific channel to continuously operate in the specific channel. Thus, the antenna diversity system 300 of the disclosure can provide a non-interrupting function for the specific channel having less transmission tolerance, so as to make the transmission service having less transmission tolerance be able to use the best antenna to perform the transmission operation.

In addition, if the spatial streams of the first channel and the second channel are both 1, then a first ratio corresponding to the amounts of the RF circuits operating in the first channel and the second channel before the signal processing unit makes the RF circuits all operating in the first channel of the channels according to the determining result may be different from a second ratio corresponding to the amounts of the RF circuits operating in the first channel and the second channel after the signal processing unit at least switches the RF circuit coupled to the antenna having the worst signal quality value in the antennas to the second channel. For example, presumed initially there is only the first RF circuit 340 operating in the first channel, there are the second RF circuit 350 and the third RF circuit 360 operating in the second channel. After the signal processing unit 370 changes the channel of at least one of the first RF circuit 340, the second RF circuit 350, and the third RF circuit 360 according to the determining result, the condition may becomes that there are two RF circuits (for example, the second RF circuit 350 and the third RF circuit 360) operating in the first channel, and there is only one RF circuit (for example, the first RF circuit 340) operating in the second channel.

Figure 4:
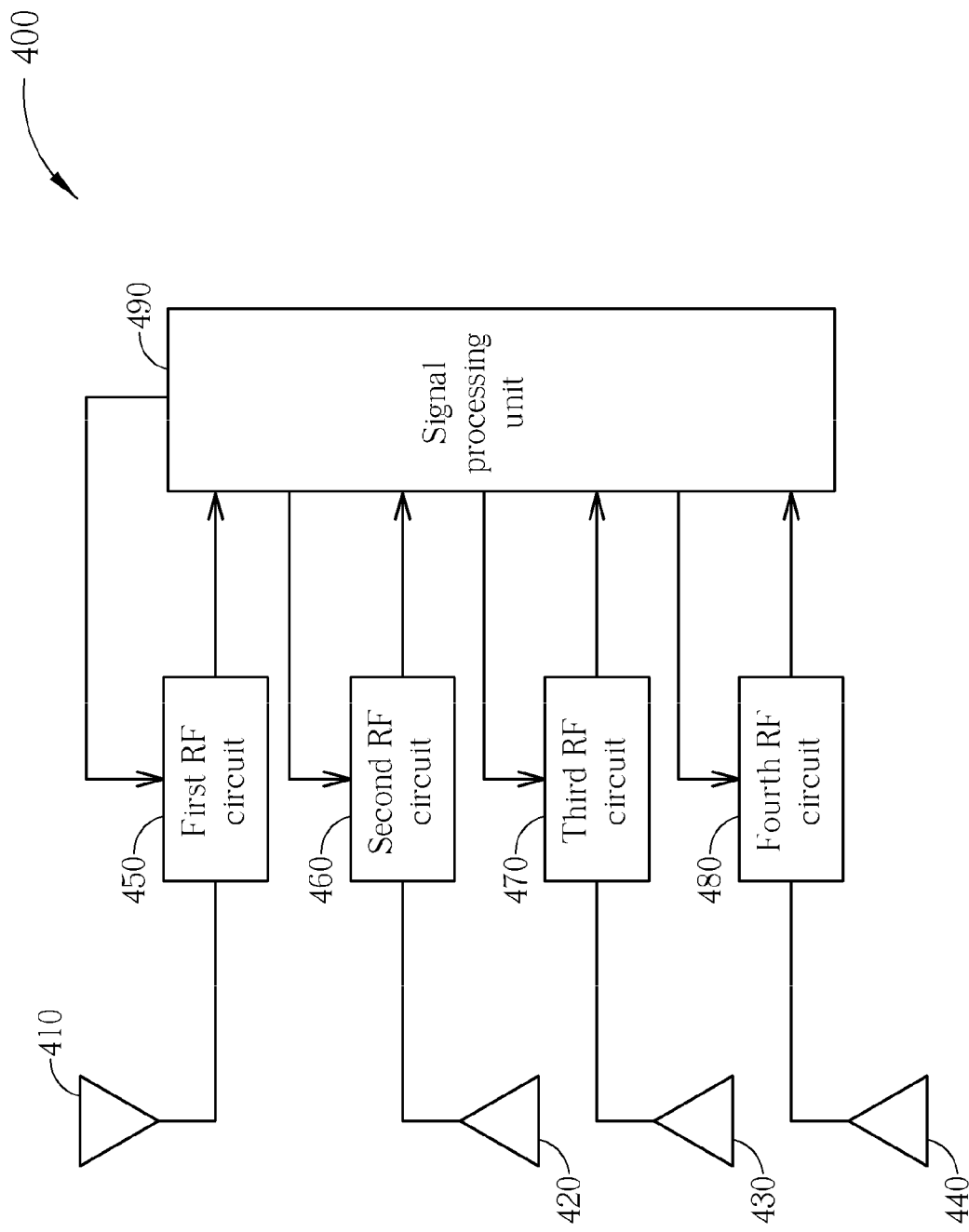
FIG. 4 shows a simplified block diagram of an antenna diversity system in a third embodiment.

In addition, please note that the above embodiment is only for an illustrative purpose and is not meant to be a limitation of the disclosure. In the antenna diversity systems 200, 300 of the disclosure, the amounts of the antennas and the RF circuits can be changed in accordance with different requirements. In any case, various modifications and alterations of the device and method should fall into the disclosed scope of the disclosure as long as the performances and functions of the antenna diversity system having non-interrupting function disclosed by the disclosure can be attained. For example, please refer to FIG. 4. FIG. 4 shows a simplified block diagram of an antenna diversity system 400 in accordance with a third embodiment of the disclosure. As shown in FIG. 4, the antenna diversity system 400 comprises: a first antenna 410, a second antenna 420, a third antenna 430, a fourth antenna 440, a first RF circuit 450, a second RF circuit 460, a third RF circuit 470, a fourth RF circuit 480, and a signal processing unit 490. The operations and functions of the elements in the antenna diversity system 400 are similar to those in the antenna diversity systems 200, 300, and thus further explanation of the operations and functions of the elements in the antenna diversity system 400 are omitted herein for the sake of brevity.

Briefly summarized, the antenna diversity system disclosed by the disclosure has a non-interrupting function, and is able to provide non-interrupting antenna diversity function for a specific channel having less transmission tolerance, so as to make the specific channel be able to use the best antenna to perform the transmission operation.

Those skilled in the art will readily observe that numerous modifications and alterations of the device and method may be made while retaining the teachings of the disclosure.

What is claimed is:

1. An antenna diversity system, comprising:
a plurality of antennas;
a plurality of radio frequency (RF) circuits, respectively coupled to the antennas, for operating in one of a plurality of channels; and
a signal processing unit, coupled to the RF circuits, for determining whether a signal quality value of at least one of the antennas is lower than a threshold to generate a determining result, and determining whether to change the channel of at least one of the RF circuits according to the determining result, so as to make at least two of the RF circuits operating in a same channel of the channels.

2. The antenna diversity system of claim 1, wherein when the signal processing unit makes the RF circuits all operating in a first channel of the channels according to the determining result, the signal processing unit is further utilized for comparing the signal quality values between the antennas, and at least changing a RF circuit coupled to an antenna having a worst signal quality value among the antennas to a second channel.

3. The antenna diversity system of claim 2, wherein before the signal processing unit makes the RF circuits all operating in the first channel of the channels according to the determining result, a first amount of the RF circuits operating in the first channel and a second amount of the RF circuits operating in the second channel correspond to a first ratio; and after the signal processing unit at least switches the RF circuit coupled to the antenna having the worst signal quality value in the antennas to the second channel, a third amount of the RF circuits operating in the first channel and a fourth amount of the RF circuits operating in the second channel correspond to a second ratio different from the first ratio.

4. The antenna diversity system of claim 2, wherein transmission tolerance of the first channel is less than that of the second channel.

5. The antenna diversity system of claim 4, wherein the first channel is a video transmission channel.

6. The antenna diversity system of claim 1, wherein the antennas comprise a first antenna and a second antenna; the RF circuits comprise a first RF circuit coupled to the first antenna and a second RF circuit coupled to the second antenna; and when the first RF circuit operates in a first channel and the second RF circuit operates in a second channel, if the signal processing unit determines the signal quality value of the first antenna in the first channel is lower than the threshold, then the signal processing unit switches the second RF circuit to operate in the first channel.

7. The antenna diversity system of claim 6, wherein transmission tolerance of the first channel is less than that of the second channel.

8. The antenna diversity system of claim 7, wherein the first channel is a video transmission channel.

9. The antenna diversity system of claim 1, wherein the antennas comprise a first antenna and a second antenna; the RF circuits comprise a first RF circuit coupled to the first antenna and a second RF circuit coupled to the second antenna; the signal processing unit is further utilized for comparing the signal quality value of the first antenna and the second antenna; and when the first RF circuit and the second RF circuit both operate in a first channel, if the signal processing unit determines the signal quality value of the first antenna in the first channel is lower than that of the second antenna in the first channel, then the signal processing unit switches the first RF circuit to operate in a second channel.

10. The antenna diversity system of claim 9, wherein transmission tolerance of the first channel is less than that of the second channel.

11. The antenna diversity system of claim 10, wherein the first channel is a video transmission channel.

12. The antenna diversity system of claim 1, wherein the antennas comprise a first antenna, a second antenna, and a third antenna; the RF circuits comprise a first RF circuit coupled to the first antenna, a second RF circuit coupled to the second antenna, and a third RF circuit coupled to the third antenna; and when the first RF circuit operates in a first channel, the second RF circuit operates in a second channel, and the third RF circuit operates in the second channel, if the signal processing unit determines the signal quality value of the first antenna in the first channel is lower than the threshold, then the signal processing unit switches at least one of the second RF circuit and the third RF circuit to operate in the first channel.

13. The antenna diversity system of claim 12, wherein transmission tolerance of the first channel is less than that of the second channel.

14. The antenna diversity system of claim 13, wherein the first channel is a video transmission channel.

15. The antenna diversity system of claim 1, wherein the antennas comprise a first antenna, a second antenna, and a third antenna; the RF circuits comprise a first RF circuit coupled to the first antenna, a second RF circuit coupled to the second antenna, and a third RF circuit coupled to the third antenna; and when the first RF circuit operates in a first channel, the second RF circuit operates in a second channel, and the third RF circuit operates in the second channel, if the signal processing unit determines the signal quality values of the second RF circuit and the third RF circuit in the second channel are both less than the threshold, then the signal processing unit switches the first RF circuit to operate in the second channel.

16. The antenna diversity system of claim 15, wherein transmission tolerance of the first channel is higher than that of the second channel.

17. The antenna diversity system of claim 16, wherein the second channel is a video transmission channel.

18. The antenna diversity system of claim 1, wherein the antennas comprise a first antenna, a second antenna, and a third antenna; the RF circuits comprise a first RF circuit coupled to the first antenna, a second RF circuit coupled to the second antenna, and a third RF circuit coupled to the third antenna; the signal processing unit is further utilized for comparing the signal quality values between the first antenna, the second antenna, and the third antenna; and when the first RF circuit, the second RF circuit, and the third RF circuit all operate in a first channel, if the signal processing unit determines the signal quality value of the first antenna in the first channel is less than the signal quality values of the second antenna and the third antenna in the first channel, then the signal processing unit switches the first RF circuit to operate in a second channel.

19. The antenna diversity system of claim 18, wherein transmission tolerance of the first channel is less than that of the second channel.

20. The antenna diversity system of claim 19, wherein the first channel is a video transmission channel.

21. The antenna diversity system of claim 1, wherein the antennas comprise a first antenna, a second antenna, and a third antenna; the RF circuits comprise a first RF circuit coupled to the first antenna, a second RF circuit coupled to the second antenna, and a third RF circuit coupled to the third antenna; the signal processing unit is further utilized for comparing the signal quality values between the first antenna, the second antenna, and the third antenna; and when the first RF circuit, the second RF circuit, and the third RF circuit all operate in a first channel, if the signal processing unit determines the signal quality value of the first antenna in the first channel is higher than the signal quality values of the second antenna and the third antenna in the first channel, then the signal processing unit switches both the second RF circuit and the third RF circuit to operate in a second channel.

22. The antenna diversity system of claim 21, wherein transmission tolerance of the first channel is less than that of the second channel.

23. The antenna diversity system of claim 22, wherein the first channel is a video transmission channel.

* * * * *